UNITED STATES PATENT OFFICE.

MURDOCH MACKAY, OF LONDON, ENGLAND, ASSIGNOR TO HENRY BASH, OF NEW YORK CITY, N. Y.

IMPROVEMENT IN VARNISHES.

Specification forming part of Letters Patent No. 209,176, dated October 22, 1878; application filed February 27, 1878.

*To all whom it may concern:*

Be it known that I, MURDOCH MACKAY, of London, England, have invented an Improved Varnish and Coating Composition for Knots, &c., of which the following is a specification:

This invention relates to a new varnish which can be used for covering knots in wood, and also for covering metal, paper, glass, stone, brick, cement, and other substances to preserve them from decay, oxidation, tarnish, or corrosion. The varnish is also applicable to ships' bottoms and submarine structures.

The invention consists in combining two parts, by measure, of benzole with one part of alcohol, and in adding to one gallon of this solvent or mixture about six pounds of ground gum-kauri.

The whole composition is put into a vessel or churn and agitated until a thick varnish is produced, which is then reduced to the requisite thickness or density by adding methylated spirits, wood-naphtha, or alcohol. In fact, the wood-naphtha or methylated spirits may be used as the equivalents of the alcohol in the first mixture of the solvent.

The composition above described is a pale and quick-drying varnish, which will readily combine with colors, and is convenient to use for covering knots in wood-work, and it is also an excellent varnish for metals, stone, slate, glass, cement, plaster, carbonate of lime, or magnesia.

This varnish is not affected by the turpentine in wood, nor by acids or alkalies, nor by the heat of the sun, nor by ordinary dampness or coldness of temperature. It is also very useful for affixing glass, composition, or metal letters to plate or window glass, or to metal or other surfaces; but for this purpose the composition is made somewhat thicker than when used for other purposes. It is thus useful also as a cement, and when used as such leaves no unseemly dark mark on the back of the glass when the letters are placed upon it.

The varnish also combines with other varnishes, mixes well with all kinds of colors to make knotting or varnish work, and flows freely when applied to large surfaces, although in the latter case a small quantity of linseed or other drying oils may be added, and also a small quantity of camphor, according to the particular use for which it is required.

As applied to steel pens the varnish is very useful, because it protects the steel from being attacked by acids or alkalies contained in different kinds of inks.

The invention is also applicable as a varnish for covering French polished tables, counters, and costly woods. In this case it is applied with a sponge or pad to the polished surface, forming a glaze thereon, which is not affected by the heat of the sun, water, spirits, beer, or wine, and which also protects the polish from being readily injured by hot plates or substances that attack varnished surfaces.

The proportions for the glazing of polished surfaces differ from those used in making varnish.

I propose to take for glazing about two parts of benzole, one part of alcohol, wood-naphtha, or methylated spirits, and two parts of kauri-gum. When the latter has been dissolved I add three parts of alcohol, wood-naphtha, or methylated spirits, and two parts of turpentine, and let the composition stand for a few days to settle and clear, when it is ready for use.

For gilt frames this varnish will be found very suitable, as it can be washed without injury. It is not affected by the heat of the sun, by cold or dampness, or by turpentine, acetic acid, weak alkalies, or by oil. It combines with all kinds of colors, will also retain its properties when stored, and as a photographic varnish its use will be found invaluable, as also for the covering of maps, charts, &c., although for the latter purpose I modify the proportions somewhat.

It will appear from the foregoing specification that my invention consists, first, in the new solvent for gums, said solvent being composed of benzole and alcohol; and, secondly, in compounding therewith gum-kauri, as already stated; but I do not confine myself to the exact proportions given, as they may be varied to suit different purposes and for different climates.

I may further mention that by adding a small quantity of oil of rosemary or other essential oil the smell of the varnish may be improved when desired.

I claim—

The composition for a varnish composed of benzole and alcohol and gum-kauri, substantially as specified.

The foregoing description of my invention signed this 29th day of January, 1878.

MURDOCH MACKAY.

Witnesses:
   J. VENNING,
   F. HARBERD.